United States Patent [19]

Sterflinger

[11] Patent Number: 5,404,187
[45] Date of Patent: Apr. 4, 1995

[54] VIRTUAL DRUM IMAGESETTER

[75] Inventor: Michael Sterflinger, Huntington, N.Y.

[73] Assignee: Exxtra Corporation, Cold Spring Harbor, N.Y.

[21] Appl. No.: 196,875

[22] Filed: Feb. 15, 1994

Related U.S. Application Data

[63] Continuation of Ser. No. 823,527, Jan. 21, 1992, abandoned.

[51] Int. Cl.$^6$ ............................................. G03B 41/00
[52] U.S. Cl. ....................................... 354/4; 347/263; 355/47; 355/104
[58] Field of Search ................. 354/4; 355/47, 104, 355/105, 110, 111; 352/228; 346/108

[56] References Cited

U.S. PATENT DOCUMENTS

| | | | |
|---|---|---|---|
| 3,025,778 | 3/1962 | Stuckens | 355/104 |
| 3,875,587 | 4/1975 | Pugsley . | |
| 4,334,770 | 6/1982 | Landsman | 355/104 |
| 4,475,787 | 10/1984 | Starkweather . | |
| 4,684,228 | 8/1987 | Holthusen . | |
| 4,698,647 | 10/1987 | Gerlach . | |
| 4,712,896 | 12/1987 | Holthusen . | |
| 4,803,497 | 2/1988 | Kennedy, Jr. et al. . | |
| 4,853,709 | 8/1989 | Stein et al. . | |

*Primary Examiner*—Monroe H. Hayes
*Attorney, Agent, or Firm*—Karl F. Milde, Jr.

[57] ABSTRACT

An imagesetter of the "internal drum" type for producing an image on a flexible section of photosensitive material. The section of material has a first end, an opposite second end and substantially parallel side edges extending between the first and second ends and delimiting between them the image area of the section. The imagesetter retains the section of material in a substantially cylindrical configuration in such a way as to provide physical contact with the section along the edges and on opposite sides of the line of scan. The scanning mechanism comprises a reflector, arranged to rotate about the central cylindrical axis, for deflecting an axial beam radially outward to the image area.

21 Claims, 4 Drawing Sheets

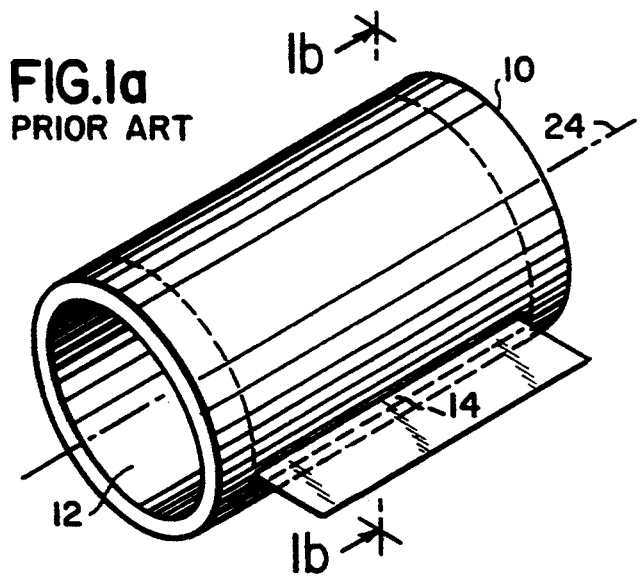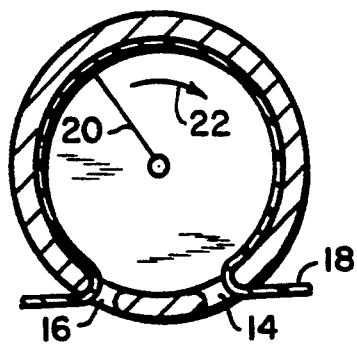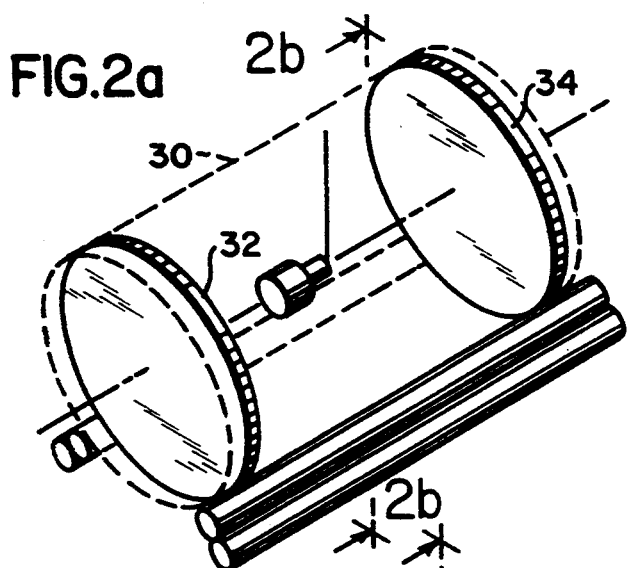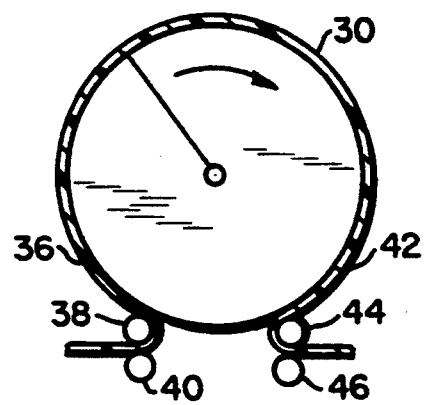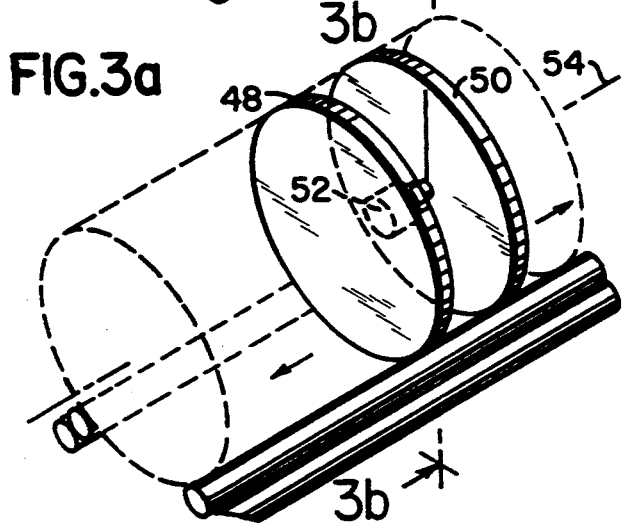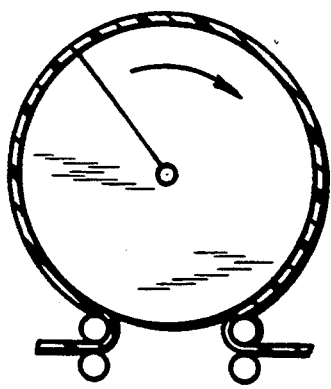
FIG.1a PRIOR ART
FIG.1b
FIG.2a
FIG.2b
FIG.3a
FIG.3b

VIRTUAL DRUM IMAGESETTER

This application is a continuation of application Ser. No. 07/823,527, filed Jan. 21, 1992, now abandoned.

BACKGROUND OF THE INVENTION

1. Field of the Invention

This invention relates to an imagesetter of the "internal drum" type generally used for the production of color separation image masters, and more particularly to a method and apparatus to form and hold the photosensitive material in a cylindrical shape without requiring a rigid cylindrical surface to back up the material.

2. Description of the Prior Art

Conventional laser raster imagesetting devices, as initially produced, created a linear writing line using either spinners or galvos with f-theta field flattening lenses or a holographic spinner with a field lens. This arrangement was combined with a film transport mechanism to move the photosensitive film or paper past the imaging line or station in order to create a two-dimensional image. The film transport mechanism has variously taken the form of a rotated external drum (Omnitech), a flat bed (Hell) where either the bed or the optical system was linearly translated, or more usually a capstan drive (Ultre, ECRM, Linotype and Agfa among others) using a flat platen or a roller platen (part of the capstan system). Devices using this technology were limited in quality by the relatively large writing spot which was obtained due to the optical field angle constraints imposed when forming a relatively long flat writing line. The capstan drive film transport system is subject to slippage, which produces small inaccuracies and non-repeatabilities in image placement. These inaccuracies have restricted the ability of these devices to produce color separation masters, which usually require four registered masters, or to produce printed circuit artwork, which requires high accuracy in image placement.

Other high quality imagesetting devices have utilized an "external drum" technology. In these devices, the photosensitive medium is wrapped around the outside of a drum which can be spun at a fast rate of speed. A writing beam is focused on the surface of the drum, and is transported slowly parallel to the spinning axis (or the writing beam is held stationary and the drum is transported axially) to form the second dimension of scan. These devices achieve an accurate small writing spot, but are relatively high in cost and limited in throughput speed because of the relatively large mass of the drum which must be rotated.

To avoid the problems associated with rotating a heavy drum, devices have been developed that utilize a so-called "internal drum" technology. See, for example, U.S. Pat. Nos. 4,684,228 and 4,712,896. These devices are characterized by having a rigid, heavy partial drum section. Mechanisms are provided to form the photosensitive film or paper to the inside of the drum; these can include vacuum systems and/or computer controlled rollers to precisely push the film against the drum surface. The optical system typically includes a laser light source, either a gas laser or a semiconductor diode laser, a focusing lens, and a monogon spinner: either a 45 degree mirror or a penta or right angle prism. This optical system provides a relatively short focal length (for the writing line length obtained), and therefor a relatively small writing spot size, enabling high resolution images to be produced. The short writing distance also results in less deviation in the uniform placement of the rasters when practical motor/spinner errors are experienced. Further, maintaining the film in a stable position inside the drum during the exposure of the two dimensional image results in highly repeatable image placement, a characteristic that is needed in the production of color separation films for color printing. Greater throughput can be achieved than in the rotating drum systems because higher rotational speeds can be achieved due to the much smaller spinner mass which must be rotated.

These devices are, however, considerably more expensive to produce than the earlier capstan film feed devices because of the massive drum sections which have been employed to create stability at the film plane.

It is desirable to produce an apparatus and method to achieve the benefits of the internal drum technology without incurring the high costs associated with massive drum structures.

SUMMARY OF THE INVENTION

It is a principal object of the present invention to provide an image setting apparatus of the "internal drum" type which is substantially less expensive but which does not sacrifice image quality and positional accuracy as compared to apparatus of this type presently known in the art.

It is a further object of the present invention to provide image setting apparatus of the internal drum type which does not require the production of a heavy drum section to maintain the positional stability of the photosensitive film or paper.

When film, paper, or most any flexible sheet material has been rolled into a cylindrical shape, the material achieves a greater rigidity and stability than when supported in the flat or planar condition. This effect will occur even if only a partial cylinder is formed by bending or bowing the sheet or by wrapping the sheet material over ring shaped sections. This principle is utilized to advantage in the present invention to limit the necessity of physical contact with the photosensitive material, thereby avoiding the requirement of a heavy drum.

In accordance with a preferred embodiment of the present invention, two cylindrical ring sections are coaxially mounted on a base, separated by almost the width of the roll of photosensitive material which is to be used. The photosensitive material (film or paper) is wrapped around the cylindrical ring sections, with the rings supporting the material, and thereby forming the material into the desired drum shape, which may be termed as a "virtual drum". The virtual drum is achieved at low cost since the support rings can be produced at a fraction of the cost of a complete rigid internal drum.

Rollers are provided to guide unexposed film or paper material onto the sections and to feed this material off the sections after it has been exposed by the laser raster writing mechanism that is transported along the axis of the virtual drum. These rollers maintain sufficient tension on the material web to maintain its full contact with the support rings, as is necessary to maintain the material in an accurate cylindrical shape. The rollers also enable re-direction of the material transport path, enabling the supply roll to be conveniently located, and enabling the output path to a take-up cassette, for example, to be conveniently located. These rollers are tangent to the virtual drum.

Since conventional photosensitive materials have a significant stiffness, some force must be applied to wrap the material around the rollers and to wrap the material around the support rings to create the virtual drum. Immediately adjacent to the point of tangency, on the virtual drum side, the internal forces within the material that resist the wrapping tend to cause the material to deviate from the accurate cylindrical shape in those areas that are not adjacent to the support rings, because there is no physical drum to resist dimpling-in of the material. Since this tendency to dimple occurs just after the point of tangency, it can be overcome by providing a small section of a physical drum. In the preferred embodiment of this invention, a rod is incorporated near the point of tangency to provide a physical restraint.

Conventional photosensitive materials may demonstrate elastic properties when a force is applied to them. The tension that is applied to maintain contact with the support rings can slightly stretch the material where it is in contact with the support rings. Nearby, the material is not constrained, and will maintain a virtual drum radius that is slightly less than the radius of the support rings; it will be a varying radius that tapers down the further it is away from the support rings to the point where it stabilizes.

Accordingly, in a further aspect of the preferred embodiment of the present invention, the optical system is provided with a cylindrical section that has the same radius as the support rings, which restores the material locally to the support ring radius. This section is transported with the optical system, moving the local restoration along with the point of exposing and assuring that all rasters are written onto material with a common radius. This inexpensive transportable section in combination with the above guide rods act to perfect the effective cylindrical shape of the virtual drum.

In general, therefore, notwithstanding the thinness and flexibility of the photosensitive film or paper, this material can be retained in a substantially cylindrical configuration by contacting the section of material over an extremely limited area, e.g., at its edges and in the immediate region which is being scanned by the laser beam. In particular, the physical contact with the cylindrical section of material can be limited to less than 10 percent of the total area without losing the precise cylindrical shape of the material.

The principle of wrapping thin, flexible material around rings or disks to achieve a virtual drum can be extended to the fabrication of a rigid drum using relatively thin but rigid sheet material. Such a drum can be created at a substantially lower cost than conventional methods of achieving a rigid physical internal drum structure.

More particularly, the drum is formed using a sheet of flexible but rigid material (e.g., of a metal or a plastic) having substantially greater rigidity than the photosensitive film or paper. The cylindrical configuration of this metal or plastic sheet is maintained in the same manner as has been described above for the photosensitive film or paper; that is, by providing circular supports adjacent the opposite edges of the sheet, either on the inside or outside surface thereof. The photosensitive film or paper can then be retained on the inner surface thereof, in the same manner as has been traditionally used with the internal drum technology.

Other features and advantages of the invention will be apparent from the description of the preferred embodiment and from the claims. For a fuller understanding of the present invention, reference should now be made to the following detailed description of the preferred embodiments of the invention and to the accompanying drawings.

BRIEF DESCRIPTION OF THE DRAWINGS

FIG. 1a is a perspective view of a heavy drum of the type conventionally used in imagesetting apparatus of the type that utilizes an "internal drum" technology.

FIG. 1b is a cross-sectional view taken along line 1b–1b in FIG. 1a.

FIG. 2a is a perspective and representational diagram of two circular support disks arranged at opposite side edges of photosensitive film or paper to retain the section of photosensitive film or paper in a cylindrical configuration in accordance with the principles of the present invention.

FIG. 2b is a cross-sectional view taken along the line 2b–2b in FIG. 2a.

FIG. 3a is a perspective and representational diagram of means for retaining a section of photosensitive film or paper in a cylindrical configuration in accordance with a second preferred embodiment of the present invention.

FIG. 3b is a cross-sectional view taken along line 3b–3b in FIG. 3a.

FIG. 4b is a cross-sectional view taken along the line 4b–4b in FIG. 4a.

FIG. 5b is a cross-sectional view taken along the line 5b–5b in FIG. 5a.

FIG. 6b is a cross-sectional view taken along the line 6b–6b in FIG. 6a.

DESCRIPTION OF THE PREFERRED EMBODIMENTS

Figure 4A:
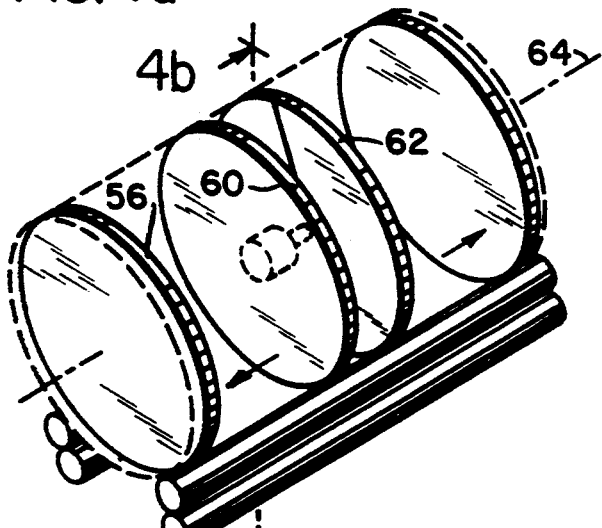
FIG. 4a is a perspective and representational diagram of an arrangement for retaining a section of photosensitive film or paper in a cylindrical configuration in accordance with a third preferred embodiment of the present invention.

The preferred embodiments of the present invention will now be described with reference to FIGS. 1–7 of the drawings.

Figs. 1a and 1b illustrate "internal drum" type imagesetting apparatus as it is presently known in the art. With this apparatus a heavy drum or cylinder 10 is cast from a metal such as steel or aluminum and carefully machined to provide a smooth cylindrical interior surface 12. The drum is also provided with longitudinal slots 14, 16 to permit the entry and egress, respectively, of a sheet or web of photosensitive film or paper 18. Once positioned, this film or paper is scanned by rotating a narrow beam 20 of radiation as may be produced, for example, by a laser, such as a helium-neon laser or a semiconductor laser diode. In addition to rotating in the direction indicated by the arrow 22, the rotating beam is translated in the direction of the central axis 24 of the drum to expose a two dimensional image on the photosensitive film or paper.

As noted above, the formation of the drum 10 is a relatively expensive procedure, due to the high precision with which the drum must be machined. This drawback is essentially eliminated while retaining the advantages and benefits of the internal drum technology by making use of the fact that the photosensitive film or paper is capable of itself of maintaining its shape once it has been formed into a cylindrical configuration. This well known principle, that a flexible sheet or web of thin material can maintain its shape when bent into a curve, is utilized to advantage in the present invention.

FIGS. 2a and 2b illustrate a first-preferred embodiment of the invention wherein the photosensitive film or paper 30 is retained near its edges by two circular supports 32 and 34. As may be seen particularly in FIG. 2b, a section of photosensitive film or paper from an elongate web of such material is passed around the circular support disks 32 and 34. The section of photosensitive film or paper 30 to be scanned has a first end 36 clamped between two rollers 38 and 40 and a second end 42 clamped between two rollers 44 and 46. The rollers 38, 40 and 44, 46 maintain a slight tension on the photosensitive film or paper 30 so that this material conforms exactly to the external circular surfaces of the supports 32 and 34.

Whereas in FIG. 2a the supports 32 and 34 are arranged adjacent to the opposite edges of the photosensitive film or paper, in FIGS. 3a and 3b the circular supports 48 and 50 are arranged a short distance from each other on opposite sides of the beam forming device 52. In this case, the circular supports 48 and 50 are transported in the direction of the axis 54 of the cylinder along with the rotating beam which is translated in the direction of the axis 54 from one side edge of the photosensitive film or paper to the other.

FIG. 4a illustrates still another embodiment of the present invention which combines the structure of the embodiments of FIGS. 2 and 3. In this case, circular supports 56 and 58 are provided at the opposite side edges of the photosensitive film or paper and two additional circular supports 60 and 62 are provided on opposite sides of the beam forming device. The supports 60 and 62 are caused to translate in the direction of the axis 64 as the beam forming device is moved in this direction.

Figure 4B:
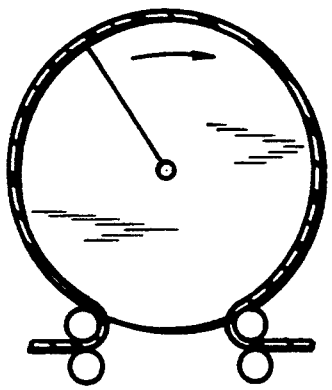
Figure 5A:
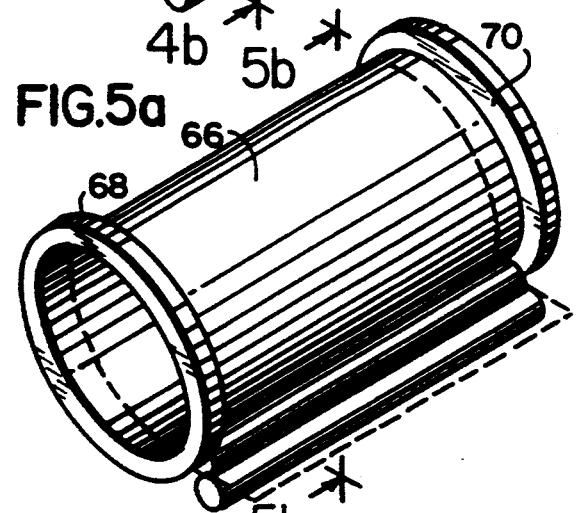
FIG. 5a is a perspective and representational diagram of an arrangement for retaining a section of photosensitive film or paper in a cylindrical configuration in accordance with a fourth preferred embodiment of the present invention.
Figure 5B:
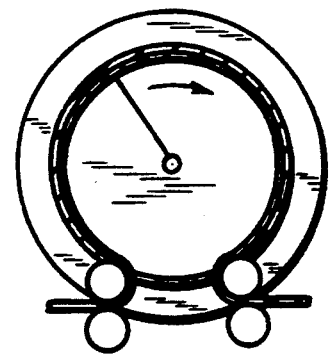
Figure 6A:
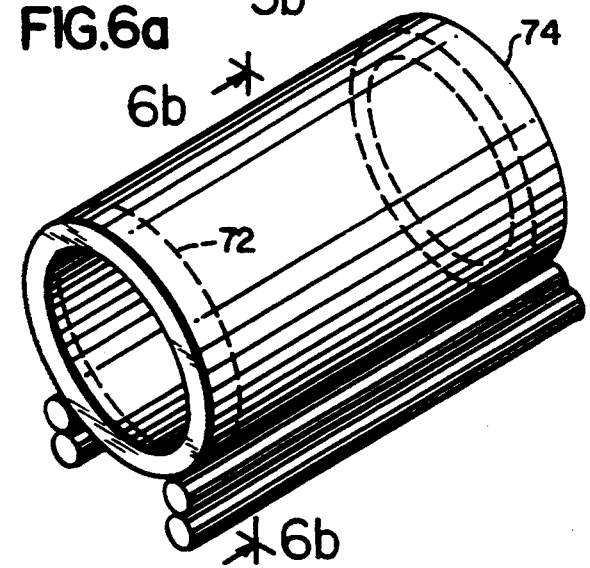
FIG. 6a is a perspective and representational diagram of an arrangement for retaining a section of photosensitive film or paper in a cylindrical configuration in accordance with a fifth preferred embodiment of the present invention.
Figure 6B:
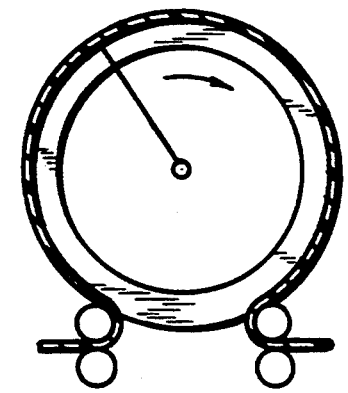

Two substantially different embodiments which, however, utilize the same principle as the embodiments of FIGS. 2-4 are illustrated in FIGS. 5 and 6. As shown in FIGS. 5a and 5b, a sheet of flexible, but relatively rigid material 66, such as sheet metal or plastic, is rolled into a cylinder and retained in this configuration by means of hollow rings 68 and 70. The cylindrical structure, so formed, is then utilized in the same manner as the heavy drum used in the known configuration of FIG. 1. Alternatively, as shown in FIGS. 6a and 6b, the rings 68 and 70 may be replaced by internal disks 72 and 74 with circular external surfaces. Instead of being retained within the rings 68 and 70, the flexible sheet material 76 is wrapped around the disks 72 and 74 and fastened thereto by means of screws or the like.

Figure 7:
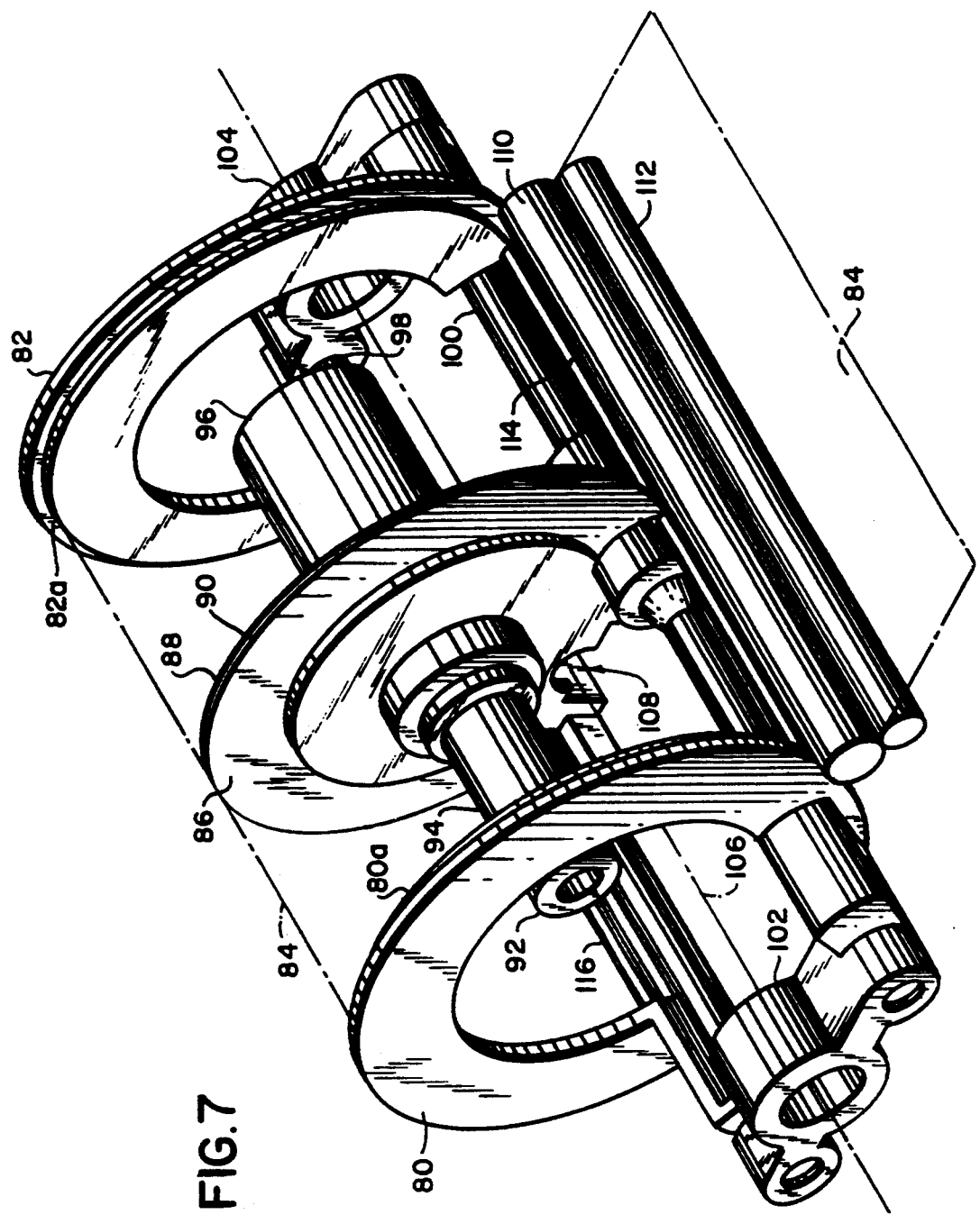
FIG. 7 is a perspective and detailed view of the embodiment of the invention represented in FIGS. 4a and 4b.

FIG. 7 illustrates in detail the embodiment of the invention shown in FIG. 4, which is currently the best mode known for practicing the invention. This embodiment comprises first and second support rings 80 and 82 for retaining the opposite edges of the photosensitive film or paper 84 in a cylindrical configuration and two internal "clam shells" 86, 88 disposed in facing relationship with a small distance 90 between them to permit passage of the rotating scanning beam. As may be seen, the widths of the clam shells 86 and 58 are substantially less than the widths of the arcuate surfaces 80a and 82a which make physical contact with the film. Consequently, the support rings and clam shells make extremely limited physical contact with the photosensitive surface of the film and permit scanning of substantially the entire width of the film.

Figure 8:
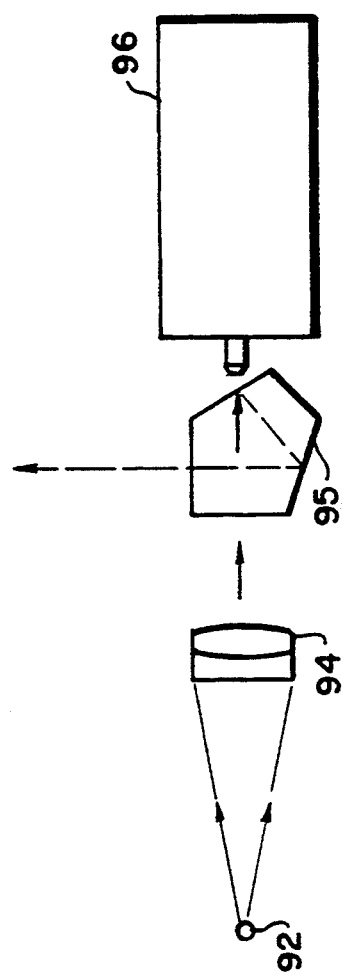
FIG. 8 is a schematic diagram of the optical system employed in the embodiment of FIG. 7.

The scanning beam is generated by a laser diode 92 and focused by a lens assembly 94. The beam is diverted from the axial direction to the radial direction by a penta prism 95 (FIG. 8) mounted to the shaft of a spin motor 96, which repeatedly scans the beam substantially linearly across the photosensitive film or paper in a direction substantially parallel to the side edges thereof.

The clam shells 86, 88, laser diode 92, lens assembly 94 and spin motor 96 are translated together in the axial direction by transporting the entire assembly on rails 98, 100. This transport is effected by rotating a lead screw (not shown) which extends through bearing mounts 102 and 104 along the lead screw axis 106. The lead screw is threaded into a lead screw nut (not shown) attached to the lower center section 108 of the clam shells 86, 88.

A slight tension is maintained on the photosensitive film or paper by passing it through a pair of rollers 110 and 112 on each side of the apparatus (only one pair of rollers being shown in FIG. 7). One of the roller pair serves as a drive roller whereas the other serves as a pressure roller, applying a "squeeze" force against the photosensitive film or paper at the nip between the two rollers. Alternatively, roller 110 could maintain tension by squeezing the film against the support rings 80 and 82.

Finally, anti-buckle rods 114 and 116 are located inside the virtual drum next to rollers 110 to prevent buckling+in, or dimpling of the film where it changes shape from the virtual drum cylinder to the cylindrical wrap around rollers 110.

There has thus been shown and described a novel virtual drum imagesetter which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Imagesetting apparatus for producing an image on a flexible section of an elongate web of photosensitive material., said section having a first end, an opposite second end and two substantially parallel side edges extending between said first and second ends and containing between them an available image area, said first and second ends being located within said web of material, said apparatus comprising:

(a) a base portion;

(b) means mounted on said base portion for retaining said section in a cylindrical arcuate configuration, said retaining means including: (1) two circular arced supports, each support being in physical contact with the surface of said photosensitive material immediately adjacent one of said edges outside of said image area and delimiting a side of said image area, said cylindrical arcuate configuration having a central axis, (2) at least one support roller, arranged substantially parallel to said central axis adjacent one end of said first and second ends, said web being Wrapped partially around said roller to change its longitudinal direction while maintaining a tensile force therein, and (3) at least one material guide disposed within the boundaries of said cylindrical configuration and adjacent said support roller for preventing said section of material from buckling away from the cylindrical arcuate configuration;

(c) means for selectively exposing said image area to radiation to produce said image, said exposing means including means for directing a modulated beam of radiation along said axis, means for redirecting said beam at an angle with respect to said axis toward said image area, means for rotating said redirecting means about said axis so as to scan said beam in the circumferential direction substantially parallel to said two edges, and means for translating said redirecting means in the axial direction so as to scan said beam in a direction substantially perpendicular to said edges, thereby to produce a two dimensional image, wherein no physical contact is made with said section in the image area thereof during exposing of the two dimensional image.

2. The imagesetting apparatus defined in claim 1, wherein said means retaining further comprises a pressure roller mounted on said base adjacent to and parallel with each of said support rollers, respectively, said first and second ends being retained in the nip between the respective ones of said support and said pressure rollers to apply a tensile force to said section of material.

3. The imagesetting apparatus defined in claim 1, wherein said translating means includes means for translating said beam in said direction with respect to a stationary section.

4. The imagesetting apparatus defined in claim 1, wherein said translating means includes means for translating said section in said direction with respect to said beam.

5. The imagesetting apparatus defined in claim 1, wherein said two circular supports are solid disks which are impervious to radiation.

6. The imagesetting apparatus defined in claim 1, wherein there are two of said support rollers, one roller being provided adjacent each of said first and second ends, and wherein there are two of said material guides, one guide being provided adjacent each one of said support rollers.

7. The imagesetting apparatus defined in claim 1, wherein said material guide is a cylindrical rod extending parallel to said axis.

8. Imagesetting apparatus for producing an image on a flexible section of an elongate web of photosensitive material, said section having a first end, an opposite second end and two substantially parallel side edges extending between said first and second ends and containing between them an available image area, said first and second ends being located within said web of material, said apparatus comprising:

(a) a base portion;

(b) means mounted on said base portion for retaining said section in a cylindrical arcuate configuration, said retaining means including: (1) two circular arced supports, each support having a first width in physical contact with a surface of said photosensitive material immediately adjacent one of said edges outside of said image area, and delimiting a side of said image area, said cylindrical arcuate configuration having a central axis, (2) at least one support roller, arranged substantially parallel to said central axis adjacent one end of said first and second ends, said web being wrapped partially around said roller to change its longitudinal direction while maintaining a tensile force therein, and (3) at least one material guide disposed within the boundaries of said cylindrical configuration and adjacent said support roller for preventing said section of material from buckling away from the cylindrical arcuate configuration;

(c) means for selectively exposing said image area to radiation to produce said image, said exposing means including means for directing a modulated beam of radiation along said axis, means for redirecting said beam at an angle with respect to said axis toward said image area, means for rotating said redirecting means about said axis so as to scan said beam in the circumferential direction substantially parallel to said two edges thereby defining a plane of scan, and means for translating said redirecting means in the axial direction so as to scan said beam in a direction substantially perpendicular to said edges, thereby to produce a two dimensional image; and (d) at least one substantially circular guide disposed adjacent the plane of scan of said beam, said guide having a second width in physical contact with said image area of said section;

wherein said first width is greater than said second width such that said guide maintains extremely limited physical contact with said image area of said section.

9. The imagesetting apparatus defined in claim 8, comprising two substantially circular guides disposed adjacent and on opposite sides of the plane of scan of said beam and maintaining physical contact with said image area of said section.

10. The imagesetting apparatus defined in claim 9, wherein said two substantially circular guides are solid disks which are impervious to radiation.

11. The imagesetting apparatus defined in claim 8, wherein said retaining means further comprises a pressure roller mounted on said base adjacent to and parallel with each of said support rollers, respectively, said first and second ends being retained in the nip between the respective ones of said support and said pressure rollers to apply a tensile force to said section of material.

12. The imagesetting apparatus defined in claim 8, wherein said translating means includes means for translating said section in said direction with respect to said beam.

13. The imagesetting apparatus defined in claim 8, wherein said at least one circular guide has substantially the same diameter as said circular arced supports.

14. The imagesetting apparatus defined in claim 8, wherein said translating means includes means for translating said beam in said direction with respect to a stationary section.

15. The imagesetting apparatus defined in claim 8, wherein there are two of said support rollers, one roller being provided adjacent each of said first and second ends, and wherein there are two of said material guides, one guide being provided adjacent each one of said support rollers.

16. The imagesetting apparatus defined in claim 8, wherein said material guide is a cylindrical rod extending parallel to said axis.

17. Imagesetting apparatus for producing an image on a flexible section of an elongate web of photosensitive material having a first end, an opposite second end and substantially parallel side edges extending between said first and second ends and containing between them an image area, said first and second ends being located within said web of material said apparatus comprising;
    (a) a base portion;
    (b) means mounting on said base portion for retaining a sheet of flexible material having substantially greater rigidity than said section in a substantially cylindrical arcuate configuration, thereby forming an inner cylindrical arcuate surface about a central axis;
    (b) means for inserting and conforming said section against said inner surface of said sheet, thereby maintaining said section in a substantially cylindrical configuration;
    (c) means for selectively exposing said area to radiation, thereby producing said image; and
    (d) means for removing said section from said inner surface of said sheet;
    wherein at least one of said inserting and removing means includes: (1) a support roller, arranged substantially parallel to said central axis, said web being wrapped partially around said roller to change its longitudinal direction while maintaining a tensile force therein, and (2) a material guide disposed within the boundaries of said cylindrical surface and adjacent said support roller for preventing said section of material from buckling away from said cylindrical surface.

18. The imagesetting apparatus defined in claim 17, wherein said section is retained on the inner surface of said sheet.

19. The imagesetting apparatus defined in claim 17, wherein said maintaining means include two substantially circular supports, each support disposed adjacent one of the side edges of said sheet and maintaining physical contact therewith.

20. The imagesetting apparatus defined in claim 17, wherein there are two of said support rollers, one roller being provided adjacent each of said first and second ends, and wherein there are two of said material guides, one guide being provided adjacent each one of said support rollers.

21. The imagesetting apparatus defined in claim 17, wherein said material guide is a cylindrical rod extending parallel to said axis.

* * * * *